(12) United States Patent
Desgranges et al.

(10) Patent No.: US 8,184,119 B2
(45) Date of Patent: May 22, 2012

(54) FAST AMBIENT OCCLUSION FOR DIRECT VOLUME RENDERING

(75) Inventors: Philippe Desgranges, Paris (FR); Klaus Engel, Donauwoerth (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/455,627

(22) Filed: Jun. 19, 2006

(65) Prior Publication Data

US 2007/0013696 A1 Jan. 18, 2007

Related U.S. Application Data

(60) Provisional application No. 60/698,830, filed on Jul. 13, 2005.

(51) Int. Cl.
| | |
|---|---|
| G06T 17/00 | (2006.01) |
| G06T 15/50 | (2011.01) |
| G06T 15/60 | (2006.01) |
| G06K 9/64 | (2006.01) |
| G09G 5/00 | (2006.01) |

(52) U.S. Cl. ......... 345/424; 345/426; 345/582; 382/279
(58) Field of Classification Search .................. 345/424, 345/426; 382/100, 103
See application file for complete search history.

(56) References Cited

U.S. PATENT DOCUMENTS

| 6,381,349 B1 * | 4/2002 | Zeng et al. ................. 382/128 |
| 7,196,704 B2 * | 3/2007 | Christensen et al. ......... 345/428 |
| 7,330,594 B2 * | 2/2008 | Rifu ............................ 382/225 |
| 2002/0109701 A1 * | 8/2002 | Deering ....................... 345/581 |
| 2004/0258305 A1 * | 12/2004 | Burnham et al. ............. 382/171 |
| 2007/0036437 A1 * | 2/2007 | Razdan et al. ............... 382/186 |
| 2009/0005707 A1 * | 1/2009 | Sarvazyan et al. ............ 600/587 |

OTHER PUBLICATIONS

GPU Gems 2; NVIDIA Corporation; Addison-Wesley; ISBN 0321335597; Mar. 2005; pp. 223-233; http://http.download.nvidia.com/developer/GPU_Gems_2/GPU_Gems2_ch14.pdf.*
Zhukov et al.; "An ambient light illumination model;" 1998, Proceedings of the Eurographics Workshop on Rendering, pp. 45-55.*
Engel, Klaus et al.: "High-Quality Pre-Integrated Volume Rendering Using Hardware-Accelerated Pixel Shading;" 2001; Proceedings of the ACM Siggraph/Eurographics workshop on Graphics; pp. 9-16.*
Kniss, Joe et al.; "Interactive Translucent Volume Rendering and Procedural Modeling;" Oct.-Nov. 2002; IEEE Visualization; pp. 109-116.*
Entezari, Alireza et al.; "Shading for Fourier Volume Rendering;" 2002; IEEE; pp. 131-138.*
Kniss, Joe et al.; "A Model for Volume Lighting and Modeling;" Apr.-Jun. 2003; IEEE Transactions on Visualization and Computer Graphics; pp. 150-162.*
Crow, Franklin C.; "Summed-Area Tables for Texture Mapping;" Jul. 1984; Computer Graphics; 207-212.*

(Continued)

*Primary Examiner* — Kee M Tung
*Assistant Examiner* — Zhengxi Liu
(74) *Attorney, Agent, or Firm* — Donald B. Paschburg

(57) ABSTRACT

A method of direct volume rendering is provided comprising combining ambient occlusion volumes terms from a plurality of different filtered volumes using filters with different radii. During an ambient occlusion computation phase, the method obtains ambient occlusion terms from a plurality of different filtered volumes and, combining the ambient occlusion terms from the plurality of different filtered volumes into a composite ambient volume occlusion. During a subsequent volume rendering phase, data acquired from the subject is processed using the composite ambient volume occlusion to obtain a shaded rendition of an image of the subject.

20 Claims, 3 Drawing Sheets

OTHER PUBLICATIONS

Stewart, A. James; "Vicinity Shading for Enhanced Perception of Volumetric Data;" Oct. 19-24, 2003; IEEE Visualization 2003; pp. 355-362.*

Online Tutorial of Convolution Matrix, http://docs.gimp.org/en/plug-in-convmatrix.html Retrieved on May 2, 2011.*

Ruiz et al. 2010. Volumetric ambient occlusion for volumetric models. Vis. Comput. 26, 6-8 (Jun. 2010), 687-695.*

Penner et al. Isosurface Ambient Occlusion and Soft Shadows with Filterable Occlusion Maps. IEEE/ EG Symposium on Volume and Point-Based Graphics (2008).*

Frida Gyllensvard. Efficient Methods for Volumetric Illumination. Dissertations No. 1406. Department of Science and Technology Linkoping University. Norrkoping 2011. (pp. 21-24 and Bibliography).*

* cited by examiner

FAST AMBIENT OCCLUSION FOR DIRECT VOLUME RENDERING

CROSS REFERENCE TO RELATED APPLICATION

This application claims priority from U.S. Provisional application No. 60/698,830, filed Jul. 13, 2005, which is incorporated herein by reference.

TECHNICAL FIELD

This invention relates generally to Volume Rendering, and more particularly to the realistic rendering of volumetric datasets (whether MR, CT or Ultrasound) to improve the realism of the images by simulating the global illumination phenomenon known as ambient occlusion.

BACKGROUND

As is known in the art, the underlying principle of direct volume rendering is to sample the volume dataset along rays in an arbitrary direction and to blend these samples together in the frame buffer. Before being alpha-blended, the densities read in the volume are converted to colors (RGBA) with a transfer function that is often encoded as a lookup table. The transfer function assigns color (Red Green Blue (i.e., RGB) and opacity (A) to each voxel, as a function of various attributes such intensity and intensity gradient magnitude. When a sufficient amount of samples are involved the result is a seamless image.

In computer graphics, the employed lightings models simulate the behavior of light and combine the different computed terms into the final pixel color. The three main light terms are: diffuse light (i.e., the consequence of light striking the surface of the object directly); specular light (i.e., light that appears locally in areas which reflect light towards the eye of the viewer; and, ambient light (i.e., indirect light coming from the environment). In most real time application, ambient light is assumed to be a constant.

Ambient lighting is essential, because it makes the parts of the dataset that are not directly lit, visible. For that reason, using a constant ambient light term gives better results in terms of image readability, though it tends to make the images look flat and unnatural. Ambient lighting is the consequence of light bouncing on the surrounding environment; consequently it comes from every direction. In reality, because objects features occlude each other, light form the environment cannot reach every point with a uniform intensity. Ambient occlusion, introduced by Zhukov et al. and is described in a paper entitled "An ambient light illumination model." (In Rendering Techniques 1998, Proceedings of the Eurographics Workshop on Rendering, pps 45-55), which defines the amount of ambient light that can reach a given point of the surface of an object. It is used to modulate the intensity of the ambient light to achieve a more believable ambient light term. Computing ambient occlusion is a global illumination problem. A basic definition of the ambient occlusion term for the points of a surface is the amount of rays that can be cast from that point and that can reach a certain distance without being stopped.

In classical surface rendering, ambient occlusion is computed on each point of a surface with a technique known as Monte Carlo ray tracing. This approach consists in casting a certain amount of rays in a stochastic fashion from a hemisphere aligned locally with the surface. It is usually a lengthy operation. As ambient occlusion is view independent, it is usually baked in a 2D texture map.

The effect of ambient light on volume data was introduced in the form of so called vicinity shading ("Vicinity Shading for Enhanced Perception of Volumetric Data", A. James Stewart, IEEE Visualization 2003). However the pre-processing time of this method is approximately 1 hour for relatively small data sets. Also, the method does not allow free manipulation of the transfer function without re-computation of the "vicinity" volume (which means that the long pre-processing time is repeated for at least some transfer function manipulations).

SUMMARY

In accordance with the present invention, a method of direct volume rendering of a subject is provided, comprising: during an ambient occlusion computation phase, obtaining ambient occlusion terms from a plurality of different blurred volumes using filters with different radii and, combining the ambient occlusion terms from the plurality of different blurred volumes into a composite ambient volume occlusion; and during a subsequent volume rendering phase, processing data acquired from the subject using the composite ambient volume occlusion to obtain a rendition of an shaded image of the subject.

In accordance with another feature of the invention, a method is provided for determining ambient occlusion terms of a volume at different frequencies comprising blurring the volume with filter kernels at different radii.

In accordance with still another feature of the invention, a method for ambient occlusion computation comprises obtaining a plurality of blur-filtered volumes from a summed area volume at different filter radii.

The method described in this invention provides a computationally less "expensive" approximation of ambient light than vicinity shading and thus much better performance. The method described in this invention does not have any restrictions on transfer function manipulations.

In accordance with yet another feature of the invention, a method of direct volume rendering of a subject is provided comprising: during an ambient occlusion computation phase, obtaining ambient occlusion volumes from a plurality of different ambient occlusion volumes sizes and, combining the ambient occlusion volumes from the plurality of different ambient occlusion volumes into a composite ambient volume occlusion. During a subsequent volume rendering phase, data acquired from the subject is processed using the composite ambient volume occlusion to obtain a rendition of an image of the subject.

More particularly, the process computes an equivalent of ambient occlusion that can be applied to volume data of a subject. The process approximates the ambient occlusion term per voxel in a second volume, i.e., the composite ambient volume occlusion. Once this secondary volume is derived from the data, it is suitable for rendering interactively using 3D hardware or a software renderer. The process provides an approximate definition of ambient occlusion suited for volume data that enables relatively rapid computation of the ambient occlusion term. The process uses an algorithm for solving ambient occlusion with a relatively low level of computational complexity. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2C showing such ray tracing at the edge of a flat boundary with a volume having a larger radius $r_2$; such volume including occlusion from a neighboring object with the larger volume $r_2$;

Reference symbols in the various drawings indicate like elements.

DETAILED DESCRIPTION

Figure 1:
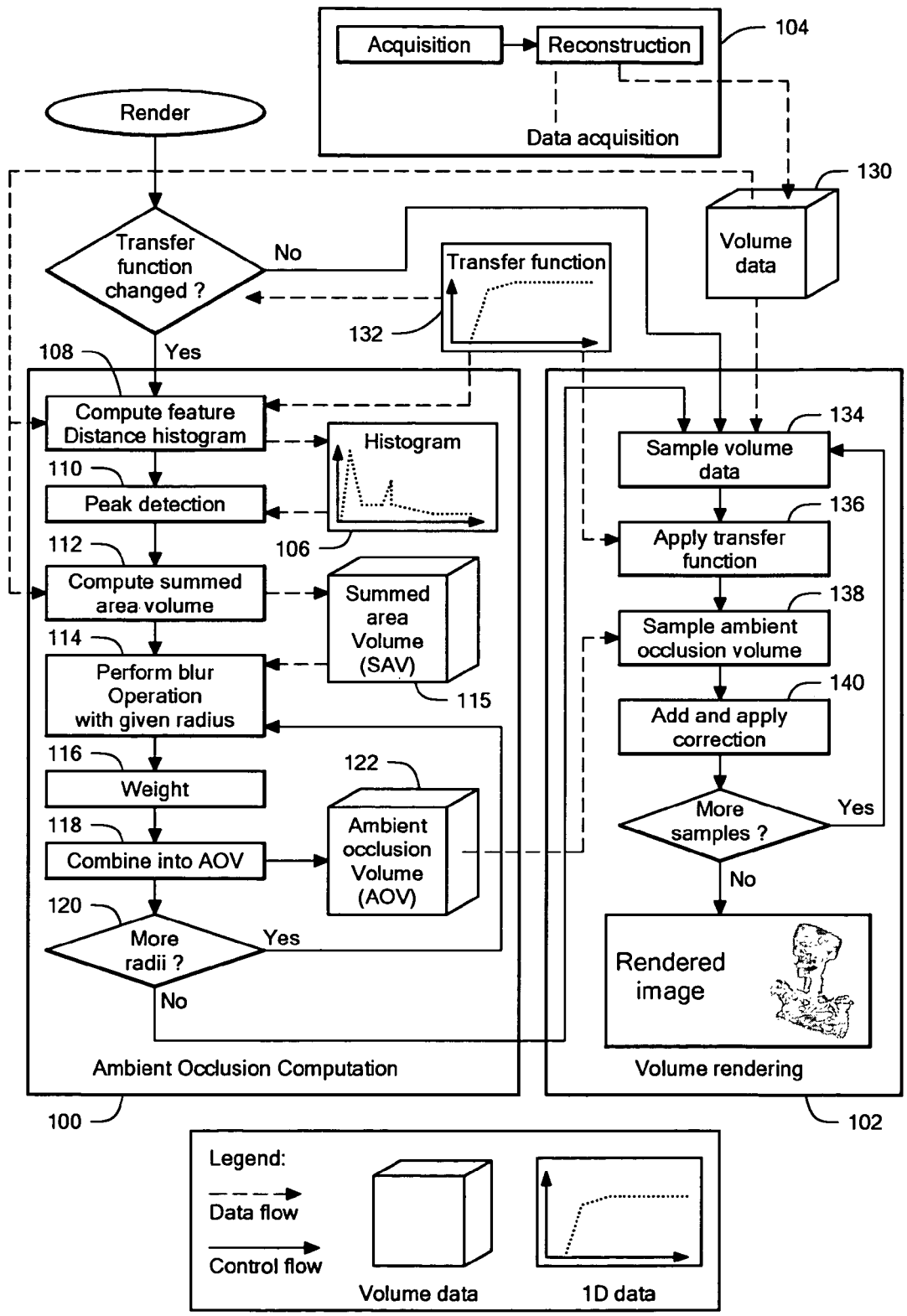
FIG. 1 is a flow diagram of a volume rendition process according to the invention.

Referring now to FIG. 1, the process of direct volume rendering of a subject includes obtaining ambient occlusion volumes from a plurality of different ambient occlusion volumes sizes during an ambient occlusion computation phase, Step 100, and, combining the ambient occlusion volumes from the plurality of different ambient occlusion volumes (Step 100) into a composite ambient volume occlusion. During a subsequent volume rendering phase Step 102, data acquired from the subject, Step 104, is processed using the composite ambient volume occlusion (Step 100) to obtain a rendition of an image of the subject.

Figure 2C:
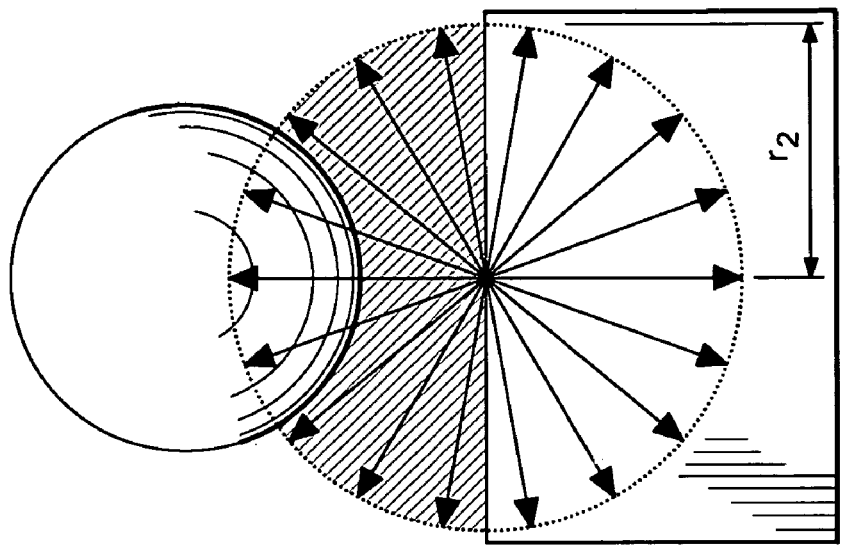
FIGS. 2A-2C are omni-directional ray casting scheme employed to compute the ambient occlusion term of a voxel, FIG. 2A showing such ray tracing at the edge of a flat boundary with a volume having a radius $r_1$; such volume having a 50 percent occlusion, FIG. 2B showing such ray tracing at the edge of a flat boundary with a volume having a radius $r_1$; such volume having, has 75% of the rays are occluded.
Figure 2B:
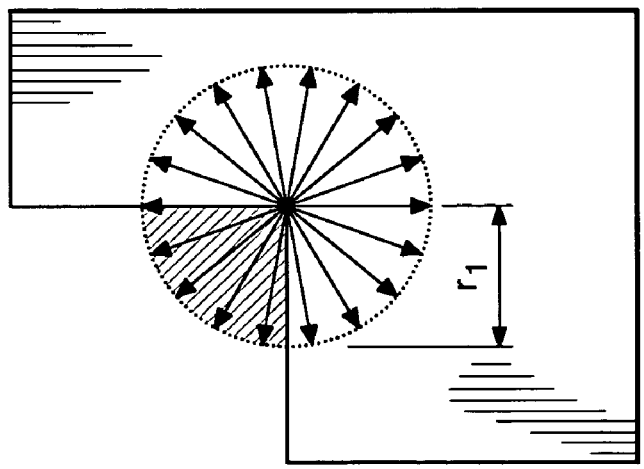
Figure 2A:
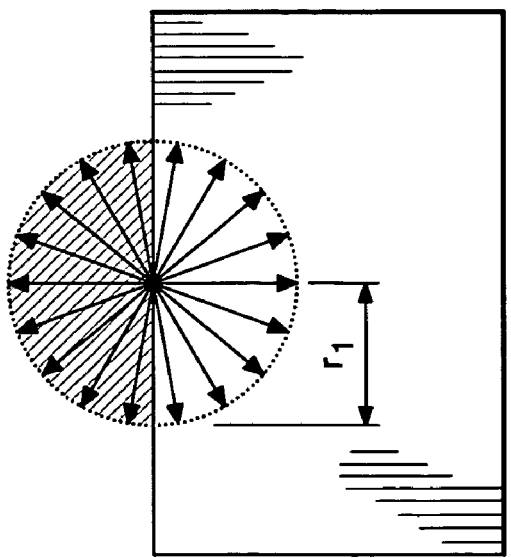

More particularly, in volume rendering formal definition of a surface is lacking and, therefore, due to the semi-transparent nature of voxels, a ray can cross a surface without being fully absorbed. This prevents assuming that rays fired into the surface are occluded all the time. To work around this one can imagine that rays are cast into every direction from each voxel, as shown in FIG. 2A. Note that in FIG. 2A, at the edge of a flat boundary (without occluders), 50% of the fired rays are not occluded. Referring to FIG. 2B, only 25% of the rays are not occluded, which is coherently half the amount as shown in FIG. 2A. Despite 50% of the fired rays being occluded, the relative proportions of calculated occlusion terms are similar to those with a hemisphere. In fact, a similar result can be achieved with a hemisphere by multiplying the results FIG. 2A by 2.

Though this approach would theoretically work, firing rays from every voxel into a sufficient amount of directions would lead to a very long computation process. As the purpose of the process is to provide interactive visualization and because the process has to be repeated each time the transfer function is changed, a pre-computation time longer than a few seconds is unacceptable. As noted above, the occlusion factor computed in FIG. 2A and FIG. 2B are respectively 50% and 25%. It is to be noted that this it matches the ratio of empty space (represented hatched) contained in a sphere of radius $r_1$ centered at the starting point of the rays. According to this, the ambient occlusion at a point with a maximum ray length of $r_1$, is roughly equivalent to the local average of the opacity of the neighboring voxels in a radius of $r_1$. This is a good approximation for sufficiently small radiuses though it only takes into account local self-occlusion of the object in little cavities and wrinkles but fails to detect more macroscopic occlusion produced by more distant features. FIG. 2C shows that occluding distant features can be detected by increasing the size of the filter kernel, as the occlusion of the sphere contributes to the calculated occlusion factor. That is, FIG. 2C shows such ray tracing at the edge of a flat boundary with a volume having a larger radius $r_2$; such volume including occlusion from a neighboring object with the larger volume $r_2$. In other words, the process convolutes the volume with a blurring kernel, (i.e., each kernel being associated with a correspondingly different occlusion volume). A convolution filter that averages data values inside a certain radius is often referred to as a blurring filter kernel, since the result of such a convolution operation is blurred (unsharp). High frequencies are lost with increasing radius of the filter kernel.

On the other hand, by averaging a larger area, the influence of the local surface perturbation is lost by the effect of blurring. The process shown in FIG. 1 combines ambient occlusion volumes from a plurality of different ambient occlusion volumes sizes.

More particularly, the process acquires ambient occlusion terms that take in account high frequency occluders (wrinkles, pores such as are acquired with relatively small ambient occlusion volumes, i.e., relatively small radii) as well as low frequency ones (large distant features such as are acquired with relatively large ambient occlusion volumes). Thus, the process reconstructs the occlusion term by modulating several octaves of blurred occlusion with varying kernel sizes. This enables inclusion of occluders at multiple frequencies. An importance factor is associated to each octave of blur depending on the amount of occlusion; the process integrates for each octave.

The Occlusion Volume (OV) in function of the dataset as follows:

$$OV(x,y,z) = 1 - C(\text{Data}(x,y,z)).\text{alpha}$$

where ".alpha" is the alpha component of a RGBA vector. With Data being the intensity volume and C being the RGBA classifications function (i.e., the transfer function).

The different blur stages are combined as follow:

$$AOV = \prod_{i=1}^{i \leq n} (Blur(OV, r_i) \times c_i + (1 - c_i))$$

n is the number of octaves uses. With Blur being a 3D blur operation, $r_i$ the radius of an octave and $c_i$ the contribution factor of an octave as $$\sum_{i=1}^{i \leq n} c_i = 1.$$

Figure 3:
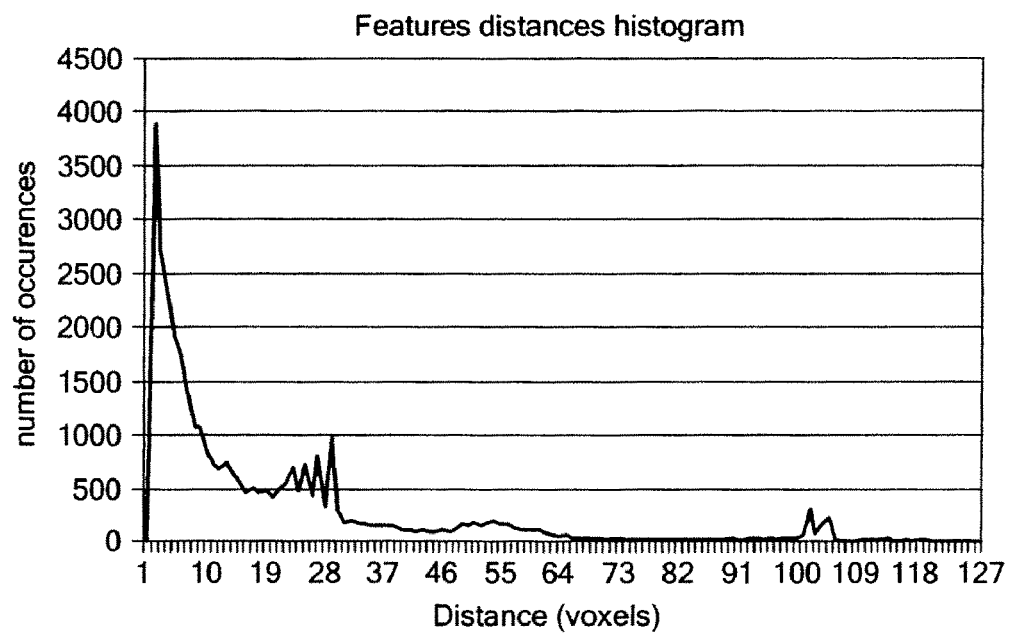
FIG. 3 is an example histogram used in the process of FIG. 1.

Referring again to FIG. 1, ambient occlusion computation includes first computing a feature discrete histogram from volume data (i.e., voxels obtained during a previous data acquisition phase), Step 108. One such histogram is shown in FIG. 3. The histogram provides the number of occlusions at different voxel distances. The required octave's radii and their respective importance depend on the topology of the dataset with the current post-classification (i.e., a function of topology and applied transfer function, e.g. a transfer function classifying bone resulting in a different topology than a transfer function classifying skin).

In Step 108, the process determines the most common spacing between features to know what distances of occlusion are the most relevant. To obtain this information, the process runs through every scan-line of the volume along the three axes. The process uses a threshold on the post-classified alpha value to differentiate between 'full' voxels and 'empty' ones. Each time the process encounters an empty part of a scan-line that is surrounded by two full voxels, the process registers its length into a histogram (H), obtained in Step 106 that counts the occurrences of gaps of every lengths, as shown in FIG. 3 for example.

Once the process obtains this histogram, the process uses a classical peak detection algorithm that provides the most commonly found distances between features with their x (i.e., voxel distance) value in the histogram, Step 110. So the locations of the n found peaks are the radius $r_i$ the process uses.

Next, the process computes the Summed Area Volume (SAV), Step 112. This is a 3D extension of the summed area table used for mipmap computation described in a paper by Franklin C. Crow, entitled "Summed-area tables for texture mapping", Proceedings of the 11th annual conference on Computer graphics and interactive techniques, pps. 207-212. 1984. More particularly, the function encoded in the summed area volume (SAV) is here defined as:

$$SAV(x, y, z) = \begin{cases} \sum_{Z=0}^{Z<=z} \sum_{Y=0}^{Y<=y} \sum_{X=0}^{X<=x} \text{volume}(X, Y, Z) \\ \text{or } 0 \text{ if } x, y \text{ or } z < 0 \end{cases}$$

One could argue that computing the summed area volume is also very expensive, fortunately, if the voxels are computed in the right order (along X, Y and then Z), SAV(x,y,z) can be expressed as, with the previously computed values:

SAV(x,y,z)=volume(x,y,z)+SAV(x−1,y,z)+SAV(x,y−1, z)+SAV(x−1,y−1,z−1)+SAV(x,y,z−1)−SAV(x−1, y−1,z)−SAV(x−1,y,z−1)−SAV(x,y−1,z−1)

This cuts the cost of computing the summed area volume down to $s^3 \times 8$ lookups and basic operations which is quite cheap and only proportional to the volume size ($s^3$). Now that the process has computed SAV in the whole domain of the volume the process can compute an arbitrary box area sum (S) in function of SAV:

S($X_{min}$,$X_{max}$,$Y_{min}$,$Y_{max}$,$Z_{min}$,$Z_{max}$)=SAV($X_{max}$,$Y_{max}$, $Z_{max}$)+SAV($X_{min}$−1,$Y_{min}$−1,$Z_{max}$)+SAV($X_{min}$−1, $Y_{max}$,$Z_{min}$−1)+SAV($X_{max}$,$Y_{min}$−1,$Z_{min}$−1)−SAV ($X_{min}$−1,$Y_{max}$,$Z_{max}$)−SAV($X_{max}$,$Y_{min}$−1,$Z_{max}$)− SAV($X_{max}$,$Y_{max}$,$Z_{min}$−1)−SAV($X_{min}$−1,$Y_{min}$−1, $Z_{min}$−1)

This expression is very convenient because it gives the ability to sum an arbitrary box of values using 8 lookups into the SAV and a few basic operations, (FIG. 6).

The computed summed area volume (SAV) is stored.

Next, in Step 114, a blurring operation is performed with a predetermined radius, $r_i$, here, for example, a radius of 2 using the SAV stored in Step 114.

These relatively small radiuses will provide small detailed features; however, with not provide effects from distant occlusion. To perform the blur operation, the process computes the kernel bounding box (FIG. 4) for each voxel, uses the previous formula to compute the sum of values and then divides by the size of the box. Note, that the algorithm must take care of boundaries, however as this is straightforward and further implementation details are not required.

The process then computes each contribution factor $c_i$, for the n radii $r_i$ from the histogram H as follows:

$$c_i = \frac{r_i}{\sum_{k=1}^{k \le n} H(r_k)}$$

Figure 4:
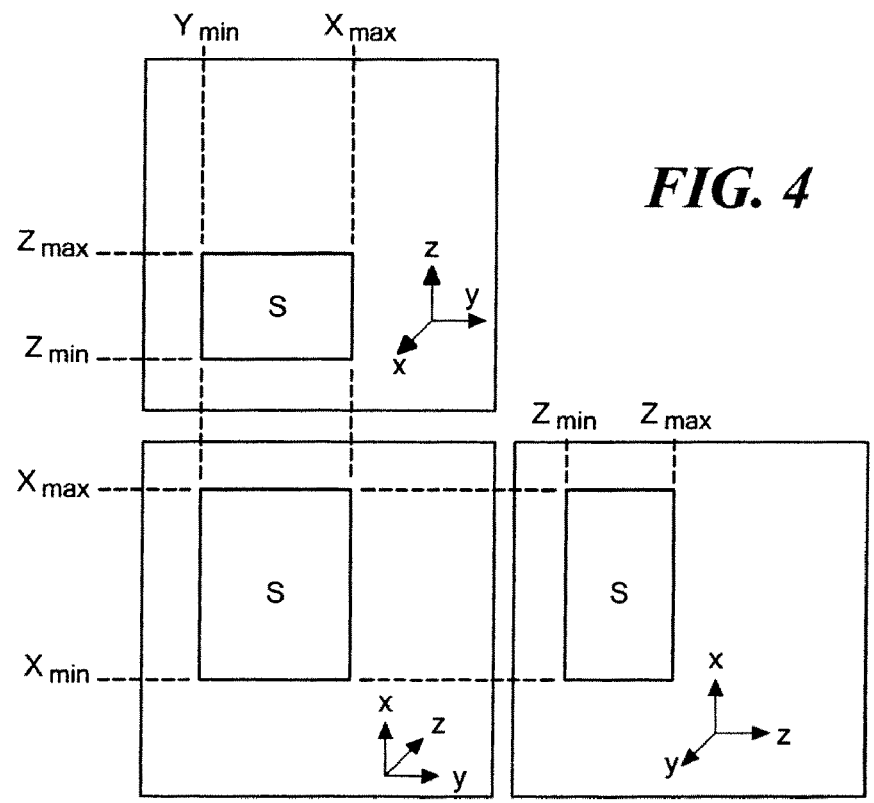
FIG. 4 is a schematic view of a box area sum operation used in the process of FIG. 1. along with its parameters.

Once the process provides the radii blurring, a volume is a straightforward convolution operation. To blur a volume with a radius r, the size of the kernel must be $(2r+1)^3$ voxels. For the sake of clarity the process here assumes that it has a cubic dataset (width=height=depth) of size $s^3$ voxels. This means that the computational cost of the convolution by using a brute-force algorithm is $s^3 \times (2r+1)^3$ multiplies and adds. This may be too costly for large volumes as the blurring radius increases. Fortunately, experiments show that blurring with a spherical kernel was not necessary and that a box kernel gave some very acceptable results. Box filtering, FIG. 4, has the advantage of being very convenient to optimize using the summed area volume (SAV) computed in step 112. To perform box blurring the process averages the values contained in the box surrounding the current voxel. This is done in two steps: first, the process adds all the values and then divides them by the size of the kernel. The minimum and maximum bounds along X,Y,Z of a given box are illustrated in FIG. 4. The following formula uses these parameters.

The box area sum operation (S) is here defined as follows:

$$S(X_{min}, X_{max}, Y_{min}, Y_{max}, Z_{min}, Z_{max}) =$$

$$\sum_{Z=Z_{min}}^{Z \le Z_{max}} \sum_{Y=Y_{min}}^{Y \le Y_{max}} \sum_{X=X_{min}}^{X \le X_{max}} \text{volume}(X, Y, Z)$$

With $X_{min}$, $X_{max}$, $Y_{min}$, $Y_{max}$, $Z_{min}$ and $Z_{max}$ defines as on FIG. 6.

To accelerate the computation of S, the process pre-computed an intermediate volume in the step 112 that contains for each voxel, the summed values of all the voxels in the box which diagonal starts at the voxel (0, 0, 0) and ends at the current voxel.

Blurring with a summed area volume is very appropriate for computing the ambient occlusion, because the actual blurring operation is very fast and only needs to compute the summed area volume once to compute all octaves of blur. This is a massive saving of CPU time. The performance achieved is very satisfying, for example, the ambient occlusion volume (dataset size $512^3$) has been computed in 0.7 seconds. This is in no way comparable to the hours of computation required to bake the ambient occlusion of a complex polygonal model using Monte Carlo ray casting. As the volume is blurred, it is acceptable to down-sample it without a noticeable loss of quality, in fact it can be down-sampled prior to be blurred to reduce the ambient occlusion baking time even more. The image uses an ambient occlusion volume of only $128^3$, which is affordable to fit in texture memory and render without significant performance loss.

Next, in Step 118 the process combines the blurred, Step 114, and weighted, Step 116, images with other radii, Step 120. That is, after selecting a radius of 2, in this example, a radius of 20 is selected as in Step 114, weighted as in Step 116, and combined with the weighted radius of 2 in this example, Step 118, and a new radius is selected, for example 40, Step 120, with the process Steps 114, 116, 118, 120 being repeated until it is determined that now further radii need be selected to thereby complete the ambient occlusion process.

It is noted that the ambient occlusion volume can be used in the shading model but some inconsistencies may appear due to the approximations. Higher density areas of the objects often tend to appear darker. To cope the ambient occlusion value can be modified (Step 140) in function of the alpha value from the transfer function for the voxel this way:

$$I(x,y,z)=\text{Clamp}(((AOV(x,y,z)+C(\text{Data}(x,y,z)).\text{alpha})\times l)^k)$$

where: l is the overall desired luminosity of the ambient occlusion (usually between 0.5 and 1); and k is the 'sharpness' of the occluded regions (i.e., where l and k are correction factor and Clamp limits to 0 (black) and 1 (white).

If the used ambient occlusion volume is of the same resolution than the data volume, this transform can be directly taken in account during the pre-computation process. If it is not then it has to be applied per fragment to avoid alignment artifacts. To make that operation friendlier to the graphics hardware, the previous function can be pre-computed in a 2D lookup table (i.e., a 2D table containing RGBA values is called 2D texture in graphics hardware (GPUs)) for a given pair (l, k) for each possible combination of AOV(x,y,z) and C(Data(x,y,z)).alpha. During rendering a corrected ambient occlusion term can easily be retrieved with a lookup into the 2D table (texture) with the alpha value from the transfer function and the uncorrected ambient occlusion value as 2D coordinates.

The resulting composite ambient occlusion volume (AOV) is stored to complete the ambient occlusion calculation process, Step 100.

The process then proceeds to volume rendering, Step 102 (FIG. 1). Here, acquired data from the subject, Step 104, is processed in Step 102 using the composite ambient volume occlusion (AOV) stored, Step 122 to obtain a rendition of an image of the subject.

Thus, the acquired volume data acquired in Step 104 was stored in memory. The volume-rendering phase used the volume data, the transfer function Step 132 and the AOV, Step 122. It is noted that the AOV must be recomputed when the transfer function changes, because the feature distance histogram computation is dependent on the transfer function. In the volume rendering phase the transfer function is used as usual during volume rendering. A scalar value is looked up from the "density" volume (Step 134) and used to lookup into the transfer function to obtain a RGBA value (Step 136). Then the ambient occlusion term is fetched (Step 138), corrected and added to the RGBA value (Step 140). This is repeated for all sample positions inside the volume (which are typically on rays from the virtual camera through each pixel of the output image through the volume).

In Step 134, the volume data stored is sampled. The transfer function is then applied to the sampled data, Step 136. The AOV stored during is sampled, Step 138. The process then corrects the ambient occlusion term with the correction formula described earlier, Step 140. The process repeats until all samples are processed in Steps 136 through 140, to thereby provided the final rendition.

A number of embodiments of the invention have been described. Nevertheless, it will be understood that various modifications may be made without departing from the spirit and scope of the invention. Accordingly, other embodiments are within the scope of the following claims.

What is claimed is:

1. A method of direct volume rendering of an object in an environment comprising: processing ambient light arriving at the object, comprising:
   during an ambient occlusion computation phase of the light processing,
      obtaining volumetric data of an object in an environment,
      determining one or more most common spacings between object features that occlude from each other light that originates from the environment,
      blurring the obtained volumetric data with a plurality of different three-dimensional low pass filters with different radii to obtain a plurality of different blurred volumes, wherein said different radii correspond to said one or more most common spacings; and
      combining the plurality of different blurred volumes into a composite ambient occlusion volume, wherein each different blurred volume is weighted by a contribution factor for its radius to the one or more most common spacings.

2. The method recited in claim 1 wherein blurring the obtained volumetric data with a three-dimensional filter of a given radius comprises averaging the volumetric data inside a box corresponding to the given radius.

3. The method recited in claim 2 wherein averaging the volumetric data inside a box comprises computing summed area volumes.

4. The method recited in claim 3 wherein computing summed area volumes (SAVs) comprises computing voxels successively along three orthogonal axes (x, y and z) as follows:

$$SAV(x,y,z)=\text{volume}(x,y,z)+SAV(x-1,y,z)+SAV(x,y-1,z)+SAV(x,y,z-1)-SAV(x-1,y-1,z)-SAV(x-1,y,z-1)-SAV(x,y-1,z-1)+SAV(x-1,y-1,z-1).$$

5. The method recited in claim 4 including computing an arbitrary box area sum (S) as a function of the SAVs:

$$S(X_{min},X_{max},Y_{min},Y_{max},Z_{min},Z_{max})=SAV(X_{max},Y_{max},Z_{max})+SAV(X_{min}-1,Y_{min}-1,Z_{max})+SAV(X_{min}-1,Y_{max},Z_{min}-1)+SAV(X_{max},Y_{min}-1,Z_{min}-1)-SAV(X_{min}-1,Y_{max},Z_{max})-SAV(X_{max},Y_{min}-1,Z_{max})-SAV(X_{max},Y_{max},Z_{min}-1)-SAV(X_{min}-1,Y_{min}-1,Z_{min}-1).$$

6. The method of claim 3, further comprising pre-computing an intermediate volume that contains for each voxel, summed values of all voxels in a box which diagonally starts at an origin voxel and ends at a current voxel, wherein said origin voxel is positioned at an origin of a coordinate system of the volumetric data.

7. The method of claim 1, wherein determining one or more most common spacings between occluding features comprises calculating a histogram of a number of occlusions at different voxel distances, and detecting peaks in the histogram, wherein said peaks correspond to the one or more most common spacings between features.

8. The method of claim 7, wherein each different blurred volume is weighted when combined according to a contribution of the corresponding peak to the histogram.

9. The method of claim 1, further comprising, during a subsequent volume rendering phase, processing data acquired from the object using the composite ambient volume occlusion to obtain a rendition of a shaded image of the object.

10. The method of claim 1, wherein the plurality of different blurred volumes are combined according to $$AOV = \prod_{i=1}^{n} ((Blur(OV, r_i) \times c_i) + (1 - c_i)),$$

wherein AOV represents the composite ambient occlusion volume, n is the number of different blurred volumes, OV is an occlusion volume that associates an occlusion factor with each point of a domain of the volumetric data, Blur(OV, $r_i$) represents a blurred volume of radius $r_i$, and $c_i$ is the contribution factor for radius $r_i$, wherein a sum of the contribution factors over all blurred volumes I is one.

11. A non-transitory program storage device readable by a computer, tangibly embodying a program of instructions executed by the computer to perform the method steps for direct volume rendering of an object in an environment comprising: processing ambient light arriving at the object, comprising:

during an ambient occlusion computation phase of the light processing,
obtaining volumetric data of an object in an environment,
determining one or more most common spacings between object features that occlude from each other light that originates from the environment,
blurring the obtained volumetric data with a plurality of different three-dimensional low pass filters with different radii to obtain a plurality of different blurred volumes, wherein said different radii correspond to said one or more most common spacings; and
combining the plurality of different blurred volumes into a composite ambient occlusion volume, wherein each different blurred volume is weighted by a contribution factor for its radius to the one or more most common spacings.

12. The computer readable program storage device of claim 11, wherein blurring the obtained volumetric data with a three-dimensional filter of a given radius comprises averaging the volumetric data inside a box corresponding to the given radius.

13. The computer readable program storage device of claim 12, wherein averaging the volumetric data inside a box comprises computing summed area volumes.

14. The computer readable program storage device of claim 13, wherein computing summed area volumes (SAVs) comprises computing voxels successively along three orthogonal axes (x, y and z) as follows:

SAV(x,y,z)=volume(x,y,z)+SAV(x−1,y,z)+SAV(x,y−1,z)+SAV(x,y,z−1)−SAV(x−1,y−1,z)−SAV(x−1,y,z−1)−SAV(x,y−1,z−1)+SAV(x−1,y−1,z−1).

15. The computer readable program storage device of claim 14, the method including computing an arbitrary box area sum (S) as a function of the SAVs:

S($X_{min}, X_{max}, Y_{min}, Y_{max}, Z_{min}, Z_{max}$)=SAV($X_{max}, Y_{max}, Z_{max}$)+SAV($X_{min}$−1,$Y_{min}$−1,$Z_{max}$)+SAV($X_{min}$−1,$Y_{max}, Z_{min}$−1)+SAV($X_{max}, Y_{min}$−1,$Z_{min}$−1)−SAV($X_{min}$−1,$Y_{max}, Z_{max}$)−SAV($X_{max}, Y_{min}$−1,$Z_{max}$)−SAV($X_{max}, Y_{max}, Z_{min}$−1)−SAV($X_{min}$−1,$Y_{min}$−1,$Z_{min}$−1).

16. The computer readable program storage device of claim 13, wherein the method further comprises pre-computing an intermediate volume that contains for each voxel, summed values of all voxels in a box which diagonally starts at an origin voxel and ends at a current voxel, wherein said origin voxel is positioned at an origin of a coordinate system of the volumetric data.

17. The computer readable program storage device of claim 11, wherein determining one or more most common spacings between occluding features comprises calculating a histogram of a number of occlusions at different voxel distances, and detecting peaks in the histogram, wherein said peaks correspond to the one or more most common spacings between features.

18. The computer readable program storage device of claim 17, wherein each different blurred volume is weighted when combined according to a contribution of the corresponding peak to the histogram.

19. The computer readable program storage device of claim 11, the method further comprising, during a subsequent volume rendering phase, processing data acquired from the object using the composite ambient volume occlusion to obtain a rendition of a shaded image of the object.

20. The computer readable program storage device of claim 11, wherein the plurality of different blurred volumes are combined according to $$AOV = \prod_{i=1}^{n} ((Blur(OV, r_i) \times c_i) + (1 - c_i)),$$

wherein AOV represents the composite ambient occlusion volume, n is the number of different blurred volumes, OV is an occlusion volume that associates an occlusion factor with each point of a domain of the volumetric data, Blur(OV, $r_i$) represents a blurred volume of radius $r_i$ and $c_i$ is the contribution factor for radius $r_i$ wherein a sum of the contribution factors over all blurred volumes I is one.

* * * * *